F. VAN DOREN.

Sheep-Shears.

No. 5,166. Reissued Nov. 26, 1872.

*Witnesses.*
Fred Haynes
J. W. Coombs

Francis Van Doren
per Brown, Coombs & Co
Attorneys

AM PHOTO-LITHOGRAPHIC CO. N.Y. (OSBORNE'S PROCESS.)

UNITED STATES PATENT OFFICE.

FRANCIS VAN DOREN, OF ADRIAN, MICHIGAN.

IMPROVEMENT IN SHEEP-SHEARS.

Specification forming part of Letters Patent No. 69,513, dated October 1, 1867; reissue No. 5,166, dated November 26, 1872.

*To all whom it may concern:*

Be it known that I, FRANCIS VAN DOREN, of Adrian, in the county of Lenawee and State of Michigan, have invented a new and useful Improvement in Shears; and I do hereby declare that the following is a full, clear, and exact description of the same, reference being had to the accompanying drawing forming part of this specification, and in which—

Figure 1:
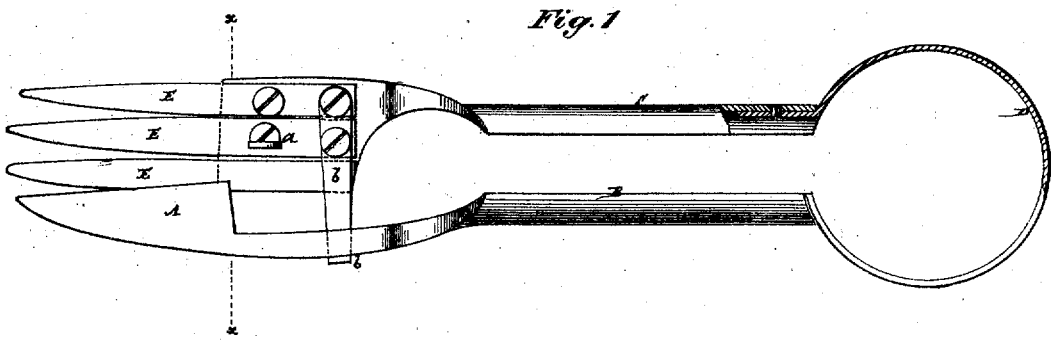
Figure 2:
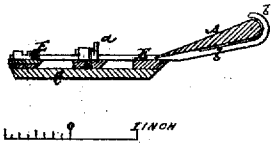

Figure 1 represents a plan or outer-face view of my improved shears, and Fig. 2 a transverse section of the same at the line *x x* in Fig. 1.

Similar letters of reference indicate corresponding parts in both figures.

This invention consists in a shears composed of two or more stationary cutters or fingers and one movable cutter arranged to sweep over each of the stationary cutters in succession, whereby two or more clips are made during each complete forward stroke of the moving cutter, and the whole clip is divided up into a series of succeeding smaller clips or cuts, thereby producing greater ease and evenness of cut, and in case of shearing animals, such as sheep, for instance, protecting the same from being cut or injured. The invention also includes a certain combination of gages with said two or more stationary cutters and single movable cutter, whereby when the shanks of the shears are connected by a spring the latter will be relieved from strain.

In the accompanying drawing, A represents the movable cutter, which is secured to a shank, B, in the usual manner. The shank B is connected with the other shank C of the shears by means of a spring, D, in the ordinary way. To the shank C are secured, in any suitable manner, two or more guards, fingers, or cutters, E E, arranged so that each of them will, in connection with the cutter A, make a complete clip, two or more succeeding clips being made during each forward stroke of the cutter A. To the shank C or to the cutters E E are secured two gages, *a* and *b*, between which the cutter A moves, whereby the spring that connects the shanks will be protected and prevented from being strained.

What I here claim, and desire to secure by Letters Patent, is—

1. A shears having two or more stationary guards or cutters, E E, and one movable cutter, A, substantially as and for the purpose herein shown and described.

2. The movable cutter A, in combination with two or more stationary guards or cutters, E E, and gages *a b*, all constructed for operation, essentially as herein shown and described.

FRANCIS VAN DOREN.

Witnesses:
R. B. ROBBINS,
WILLARD STEARNS.